Figure 1:
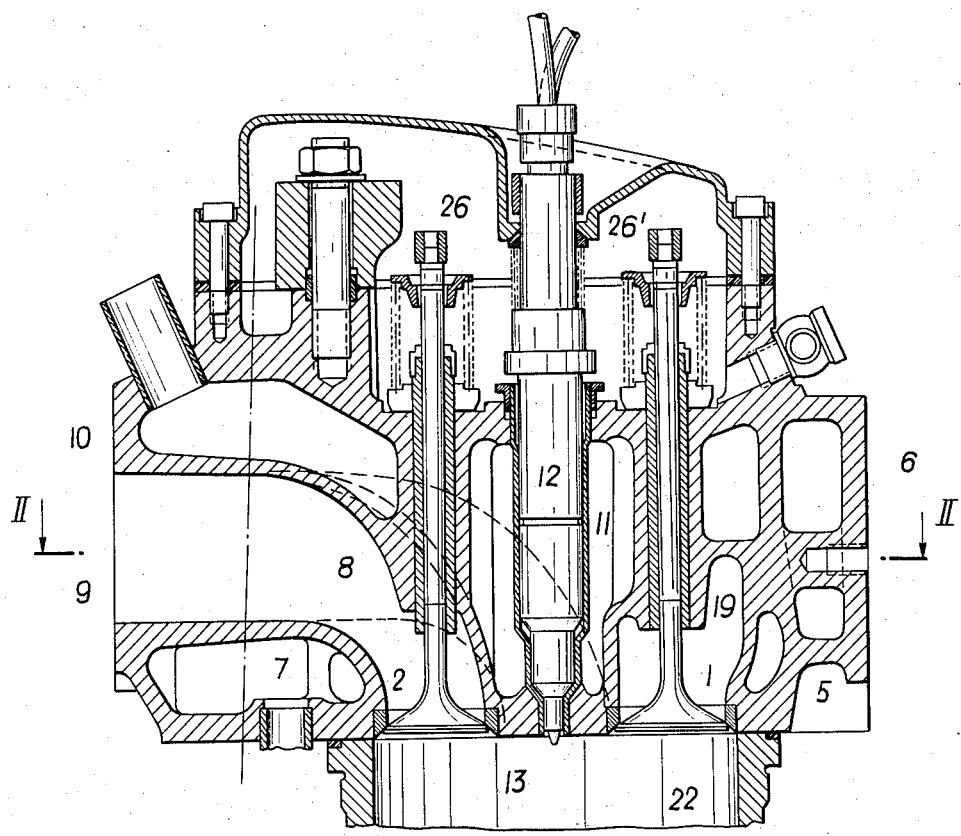

United States Patent [19]
Skatsche et al.

[11] 3,824,971
[45] July 23, 1974

[54] INTERNAL COMBUSTION ENGINE WITH TWO INTAKE AND TWO EXHAUST VALVES

[75] Inventors: Othmar Skatsche; Gerhard Thien; Karl Kirchweger, all of Graz, Austria

[73] Assignee: Hans List, Graz, Austria

[22] Filed: Aug. 2, 1972

[21] Appl. No.: 277,289

[30] Foreign Application Priority Data
Aug. 3, 1971   Austria .............................. 6787/71

[52] U.S. Cl. ........ 123/75 B, 123/188 M, 129/193 H
[51] Int. Cl. ..................... F02m 35/10, F02b 31/02
[58] Field of Search .......... 123/188 M, 75 B, 193 H

[56] References Cited
UNITED STATES PATENTS

| | | | |
|---|---|---|---|
| 2,466,181 | 4/1949 | Myrick | 123/75 B |
| 3,045,655 | 7/1962 | Formia | 123/188 M |
| 3,054,390 | 9/1962 | Meurer | 123/188 M |
| 3,411,490 | 11/1968 | Akana | 123/188 M |

FOREIGN PATENTS OR APPLICATIONS
2,017,877   11/1970   Germany ....................... 123/193 H

*Primary Examiner*—Charles J. Myhre
*Assistant Examiner*—W. Rutledge, Jr.
*Attorney, Agent, or Firm*—Watson, Cole, Grindle & Watson

[57] ABSTRACT

An internal combustion engine with two suspended intake valves for each cylinder, of which the first intake valve is connected to a tangential duct extending approximately in transverse relation to the engine, and the second intake valve is connected to an inlet port emerging from the same cylinder-head sidewall as the first-mentioned inlet port and extending approximately in the longitudinal direction of the engine and terminating as a spiral, wherein the axis of the first intake valve is located approximately in the longitudinal median plane of the engine and the axis of the second intake valve is situated in a transverse plane of the engine including the axis of the associated cylinder.

1 Claim, 3 Drawing Figures

INTERNAL COMBUSTION ENGINE WITH TWO INTAKE AND TWO EXHAUST VALVES

The invention relates to an internal combustion engine with two intake and two exhaust valves, all of which are of the suspended type, one intake and one exhaust valve each being arranged opposite each other with relation to the cylinder axis, and with separate inlet ports, one of which is designed as a tangential duct and the other, which leads to the intake valve changes with a bend into a direction approximately parallel to the longitudinal median plane of the engine, and is designed as a spiral duct.

With this engine of known design the axis of valves of like denomination are located in a longitudinal plane of the engine which is laterally offset in relation to the cylinder axis. The two inlet ports which emerge from apertures of the upper boundary wall of the cylinder-head located in close proximity of each other, are inclined in relation to the upper and lower cylinder-head boundary surface respectively at an angle of approximately 45°. The inlet ports which extend in parallel relation to each other over a major portion of their length also form actute angles with the longitudinal median plane of the engine. With such a port arrangement, in order for the combustion air flowing into the cylinder from the two intake valves to rotate in the same direction, it is necessary to have the spiral duct surround the axis of the associated valve in almost one complete winding. However, this leads to relatively high flow losses in the spiral duct, thereby producing greatly differing flow conditions in the two inlet ports. Besides, the comparatively steep slope of the inlet ports descending towards the valves is inconvenient insofar as the tangential flow components responsible for the rotation of the air for combustion in the cylinder become comparatively small.

Moreover, the known arrangement of the inlet ports is feasible only in connection with internal combustion engines where the space abov the cylinder-head has not been taken up by other structural elements, so that sufficient space is available for the accomodation of the inlet port apertures.

Another drawback of the conventional engine design resides in the required arrangement of the valves calling for the provision of a relatively expensive and complicated driving mechanism.

It is the object of the present invention to avoid the shortcomings of the known type of internal combustion engine and to provide an arrangement intensifying the rotation of the air for combustion in the cylinder and reducing flow losses in the ducts considerably. According to the invention, the two inlet ports emerge in a manner known per se from the same side of the cylinder-head, while the axis of the first intake valve connected to the tangential duct is located approximately in the longitudinal median plane of the engine, and the axis of the second intake valve connected to the spiral duct is situated in a transverse plane including the cylinder axis and forming an angle of about 90° with the longitudinal median plane, and finally, the tangential duct extends approximately in transverse relation to the engine and the section of the spiral duct located in front of the spiral runs approximately in the longitudinal direction of the engine.

Experience has shown that this arrangement of the valves and of the inlet ports produces the most convenient air rotation in the cylinder, since the air enters through the two intake valves mainly in a tangential direction and in the same sense of rotation, while countercurrents, commonly frequent in spiral ducts, are largely avoided. To produce these favorable flow conditions the pattern of the spiral duct in the area in front of the spiral-shaped section is of decisive importance, since the air for combustion in this place, that is, in the immediate vicinity of the valve, is directed in an approximately tangential direction. As a result, the air for combustion flows into the cylinder predominantly over that sector of the valve periphery which ensures that a rotational current is produced flowing the same direction in relation to the cylinder axis.

Consequently, the internal combustion engine according to the invention is superior to those of known design wherein the air for combustion is delivered to the two intake valves via a sprial duct for each valve. In fact, the use of two spiral ducts is responsible for the presence in the area between the two intake valves, of flow components of opposite directions causing considerable interference with the intended air rotation in the cylinder.

According to another embodiment of the invention the inlet ports emerging from the same side of the cylinder can be very short and relatively slightly inclined, so that only minor flow resistances are produced in the inlet ports and moreover, the air for combustion flows into the cylinder with a relatively small inclination. Flow losses in the spiral duct are comparatively low because as compared with engines of conventional design, there is less deflection of the air for combustion in the spiral-shaped duct section.

It is furthermore possible according to the invention to save a considerable amount of space in the inlet port system, providing greater leeway for the design and accommodation of an outlet port system producing advantageous flow conditions. Finally, the arrangement of the valves according to the invention offers the noteworthy advantage of permitting of the use of a valve gear of plain design while avoiding the provision of additional drag levers. In particular, the valve can be driven in a manner known per se by means of two valve rockers each of which actuates a pair of valves via a bridge interconnecting the valves.

According to another feature of the invention, the air exhaust from the second intake port can be intensified as a result of the particular course and cross-sectional pattern of the spiral duct over the sector of the intake valve periphery in the proximity of the inner wall of the cylinder. For example, it is possible to impart to the tongue of the spiral part, this is, the wall portion in contact with the valve guide bearing of the associated intake valve, a direction forming an actue angle with the tangential direction so that the in-flowing air for combustion is still further deflected by the duct tongue in the direction of the inner wall of the cylinder. By appropriately shaping the spiral-like duct portion it is then possible to determine the preferred sector through which the air for combustion flows through the valve gap into the cylinder.

According to yet another embodiment of the invention, particularly favorable flow conditions can be obtained by having the inlet ports emerge in a manner known per se from a common receiving chamber of the cylinder-head. In that case, the two inlet ports can be of considerably shorter length, thereby further decreasing flow losses and moreover, a very uniform distribution of the air for combustion among all of the cylinders is obtainable.

Figure 2:
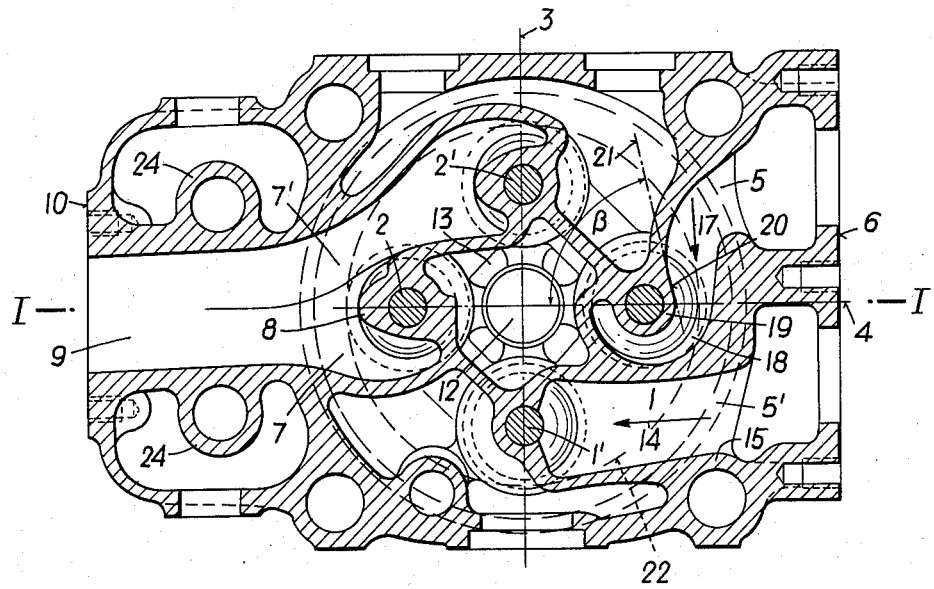
Figure 3:
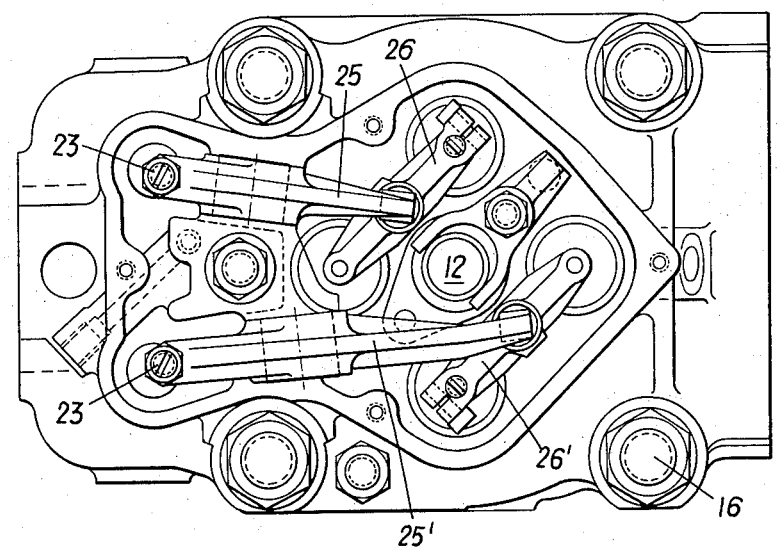

Further details of the invention will become apparent from the following description of an embodiment of the invention with reference to the accompanying drawings showing only such parts of the internal combustion engine as are essential for the understanding of the scope of the present invention. In the drawings:

FIG. 1 is a cross-sectional view of the cylinder-head of an internal combustion engine according to the invention with a section extending through the axis of the associated cylinder in transverse relation to the longitudinal axis of the engine on line I-I of FIG. 2, FIG. 2 is a horizontal cross-sectional view of the cylinder-head on line II-II of FIG. 1, and FIG. 3 is a top plan view of the cylinder-head shown in FIG. 1 with the valve cover removed.

The water-cooled, fuel-injection-type internal combustion engine according to the invention comprises two suspended intake valves, 1, 1' and exhaust valves 2,2'; each intake valve is arranged opposite an exhaust valve in relation to the cylinder axis, the axes of the valves 1' and 2' being situated approximately in the longitudinal median plane 3 of the engine and the axies of the valves 1 and 2 in a transverse plane 4 which is normal to the plane 3.

Leading to the intake valves 1,14 are separate inlet ports 5,5', of which the port designated by reference number 5 is designed as a spiral duct and the other 5' as a tangential duct. The inlet ports 5,5' emerge from the same sidewall 6 of the cylinder-head.

From the two exhaust valves 2,2' exhaust valve ducts 7,7' emerge, merging in the area of the valve guide bearing 8 of the exhaust valve 2 so as to form common exhaust port 9 terminating on the opposite sidewall 10 of the cylinder-head. The injection nozzle 12 of the internal combustion engine mounted in a nozzle-holder sleeve 11 extends through the portion of the cooling-water chamber 13 of the cylinder-head located between the valves 1, 1', 2, 2' in coaxial relation the the cylinder axis.

Apart from the arrangement of the valve according to the invention, an essential feature of the invention is the particular shape of the two inlet ducts 5, 5' producing a substantially intensified air rotation in the cylinder as compared with engines of conventional design. For that purpose, the inlet port designed as a tangential port 5' takes the direction indicated in FIG. 2 by the arrow 14, and forming an angle of approximately 90° with the longitudinal median plane 3 of the engine. Certain deviations from this direction are of course, permissible depending on given structural requirements. This position of the tangential duct 5' makes it possible for same to be of a very short length and only slightly inclined in relation to the underside of the cylinder-head. This results in a low flow resistance and in a direction of the air entering the cylinder via the valve gap which has a favorable effect on the rotation of the air in the cylinder. Furthermore, since there is ample space available between the adjacent bolt bearing 15 for the cylinder-head cap screw 16 and the adjoining wall of the spiral duct 5, the tangential duct 5' can be designed with a comparatively large cross-sectional area.

The initially approximately radial spiral duct 5 is bent into a direction indicated by the arrow 17 which is at least approximately parallel to the longitudinal median plane 3 of the engine. This duct section is joined by the section of the spiral duct 5 designated by reference number 18 and wound around the guide bearing 19 of the valve 1. The tongue of the spiral duct 5, designated by reference number 20, the area, that is, wherein the duct wall comes into contact with the valve guide bearing 19, is situated in a plane 21 forming with the transverse plane 4 an angle beta which is preferably slightly smaller than 90°.

As a result of this design of the spiral duct 5, the air current from the intake valve 1 into the cylinder via the peripheral sector of the intake valve 1 adjoining the inner wall 22 of the cylinder is intensified. In this manner flow components are avoided whose positive direction is opposed to the required air rotation in the cylinder and would, consequently, impair the formation of an intense rotational current. Another advantage of the design of the duct according to the invention resides in the fact that the air for combustion is only subject to a relatively minor deflection in the spiral-shaped duct portion 18, so that as compared with engines of conventional design flow losses in this duct area are negligible.

The design of the internal combustion engine according to the invention permits, moreover, the provision of a very plain valve gear of conventional design, as illustrated in particular, in FIG. 3. The valve is actuated by means of a camshaft (not shown in the drawing) via two pushrods 23 extending through the cooling-water chamber of the cylinder-head in bearings 24, each of these pushrods operating a valve rocker 25 and 25' respectively, of which the one designated by reference number 25 actuates via a bridge 26 the two exhaust valves 2, 2', while the other 25' actuates the two intake valves 1, 1' via a bridge 26'.

I claim:

1. In an internal combustion engine having two intake valves and two exhaust valves for each cylinder, said intake and exhaust valves being arranged in a suspended array, one of said intake valves and one of said exhaust valves being opposite one another in relation to the cylinder axis, the axis of a first of said intake valves being located approximately on a longitudinal median plane of the internal combustion engine, the axis of a second of said intake valves being located on a transverse plane of the engine approximately normal to the longitudinal median plane and including the cylinder axis, a first inlet port originating at the cylinder head side closest to said second intake valve and extending substantially in transverse relation to the longitudinal median plane of the engine as far as said first intake valve, a second inlet port designed as a spiral duct originating at said side of said cylinder head and extending substantially in the longitudinal direction of the engine as far as said second intake valve, the combination of the following features:

said first inlet port being designed as an inclined duct having a straight line axis extending approximately in a direction to and intersecting with the axis of said first intake valve;

said second inlet port extending from said side of the cylinder head and changing with a bend into a direction approximately parallel to the longitudinal median plane of the engine;

an inner wall of said second inlet port changing tangentially into the guide bearing of said second intake valve and defining a duct tongue in conjunction with said guide bearing;

* * * * *